United States Patent
Peter

(10) Patent No.: US 7,781,518 B2
(45) Date of Patent: *Aug. 24, 2010

(54) AROMATIC DIAMINE POLYURETHANE CURATIVES WITH IMPROVED STABILITY

(75) Inventor: Thomas H. Peter, Southbury, CT (US)

(73) Assignee: Crompton Corporation, Middlebury, CT (US)

( * ) Notice: Subject to any disclaimer, the term of this patent is extended or adjusted under 35 U.S.C. 154(b) by 960 days.

This patent is subject to a terminal disclaimer.

(21) Appl. No.: 10/277,435

(22) Filed: Oct. 22, 2002

(65) Prior Publication Data

US 2004/0186228 A1 Sep. 23, 2004

Related U.S. Application Data

(63) Continuation of application No. 09/956,395, filed on Sep. 18, 2001, now Pat. No. 6,525,131.

(51) Int. Cl.
- C08G 18/32 (2006.01)
- C08G 18/10 (2006.01)
- C08K 5/11 (2006.01)
- C08K 5/3432 (2006.01)
- C08K 5/3435 (2006.01)

(52) U.S. Cl. ............ 524/720; 252/182.13; 252/182.29; 524/102; 528/53; 528/63; 528/64

(58) Field of Classification Search ............ 252/182.13, 252/182.29; 524/102, 720; 528/53, 63, 64
See application file for complete search history.

(56) References Cited

U.S. PATENT DOCUMENTS

| | | | |
|---|---|---|---|
| 3,640,928 A | 2/1972 | Murayama et al. | 524/99 |
| 3,840,494 A | 10/1974 | Murayama et al. | 524/102 |
| 4,021,432 A | 5/1977 | Holt et al. | 546/188 |
| 4,046,737 A | 9/1977 | Holt et al. | 524/99 |
| 4,619,956 A | 10/1986 | Susi | 524/87 |
| 5,081,258 A | 1/1992 | Kawaguchi | 548/260 |
| 5,492,948 A | 2/1996 | Chang et al. | 524/100 |
| 5,562,586 A | 10/1996 | Hyde-Smith | 588/250 |
| 5,874,619 A | 2/1999 | Wiggins et al. | 564/437 |
| 6,127,505 A | 10/2000 | Slagel | 528/61 |
| 6,174,984 B1 | 1/2001 | Peter | 528/64 |
| 6,309,313 B1 * | 10/2001 | Peter | 473/378 |
| 6,435,986 B1 * | 8/2002 | Wu et al. | 473/378 |
| 6,525,131 B1 * | 2/2003 | Peter | 524/720 |
| 6,635,716 B2 * | 10/2003 | Voorheis et al. | 525/261 |

FOREIGN PATENT DOCUMENTS

| | | |
|---|---|---|
| GB | 1399239 | 6/1975 |
| JP | 03195770 | 8/1991 |

* cited by examiner

*Primary Examiner*—Rabon Sergent
(74) *Attorney, Agent, or Firm*—Joseph Suhadolnik

(57) ABSTRACT

Disclosed herein is a composition comprising an aromatic diamine that is a solid at room temperature and a stabilizing quantity of a hindered amine light stabilizer and its use as a polyurethane curing agent.

9 Claims, No Drawings

AROMATIC DIAMINE POLYURETHANE CURATIVES WITH IMPROVED STABILITY

This application is a continuation of U.S. application Ser. No. 09/956,395, filed on Sep. 18, 2001, now U.S. Pat. No. 6,525,131.

BACKGROUND OF THE INVENTION

1. Field of the Invention

The present invention is related to the stabilization of aromatic diamines. More particularly, the present invention is related to the use of a hindered amine light stabilizer to reduce the discoloration of aromatic diamines at high temperature.

2. Description of Related Art

The use of stabilizers in polyurethane elastomers is well known in the art. These stabilizers are often used to protect the polyurethane elastomer or coating from the effects of heat, light, and ultraviolet radiation. Primary antioxidants, such as hindered phenolics, are often used to protect against oxidation at elevated temperatures. UV absorbers, such as the benzotriazoles, and hindered amine light stabilizers (HALS) can be used to retard discoloration (yellowing) of cured polyurethanes.

In the preparation of polyurethane elastomers, aromatic diamines that are solid at room temperature are often used as a curative. These compounds need to be melted at elevated temperatures in order to be used. The most common of these high melting diamines is methylene bis-orthochloroaniline (MOCA). Commercial, technical grade, MOCA is actually about 90% methylene bis-orthochloroaniline and 7-8% of a triamine analog containing three aromatic rings instead of two. MOCA is commonly heated to about 130° C. and held as a liquid for use in polyurethane elastomer production operations.

Maintaining these aromatic diamines as liquids at high temperature can present problems for the polyurethane elastomer producer. Over time, the curative begins to degrade. The first problem this causes is that the color becomes darker, which changes the color of the elastomer produced. Thus, the elastomer producer is often required to discard the curative as a toxic waste and begin with fresh material. If further degradation is allowed, the properties of the polyurethane elastomer can also suffer, which often leads to failure of the elastomer in use (such as in an industrial tire).

Thus, it is desirable to develop a method for the stabilization of aromatic diamines, particularly MOCA, against the effects of high temperature degradation. Preferably, the stabilizer would prevent both the discoloration of the aromatic diamine and the formation of byproducts and associated loss of assay.

U.S. Pat. No. 3,640,928 discloses the stabilization of synthetic polymers including a polyolefin, a polyvinyl chloride, a polyvinylidene chloride, a polyurethane, and a polyamide against photo- and thermo-deteriorations thereof by incorporating therein a piperidine derivative in a sufficient amount to prevent such deteriorations thereof, usually in an amount of 0.01 to 5.0% by weight based on the amount of the synthetic polymer.

U.S. Pat. No. 3,840,494 discloses the stabilization of synthetic polymers including a polyolefin, a polyvinyl chloride, a polyvinylidene chloride, a polyacetal, a polyester, and a polyamide against photo- and thermo-deterioration by incorporating therein monobasic, dibasic, tribasic, or tetrabasic acid esters of 4-piperidinol derivatives in an amount sufficient to prevent such deterioration.

U.S. Pat. Nos. 4,021,432 and 4,046,737 and U.K. Patent No. 1,399,239 disclose 1- and 4-substituted piperidines as stabilizers for organic material. They are produced by reacting the corresponding 1-substituted piperidinols with acid chlorides or corresponding 4-substituted piperidines with a compound introducing a residue into the 1-position.

U.S. Pat. No. 5,874,619 discloses the reduction of existing coloration of a liquid ring-polyalkyl-substituted aromatic primary diamine by blending into such diamine a color-reducing amount of at least one dihydrocarbylhydroxylamine. Preferably, the resultant product is stored in a closed container under an inert atmosphere.

U.S. Pat. No. 6,127,505 discloses an optically clear, high hardness, impact resistant polyurethane which is said to provide exceptionally high heat distortion temperatures and excellent chemical resistance. The invention is also said to be particularly useful for transparency applications that require excellent impact resistance coupled with high heat distortion temperatures.

U.S. Pat. No. 6,174,984 discloses a polyurethane elastomer that comprises the reaction product of: A) a prepolymer of at least one diisocyanate and at least one polyether polyol selected from the group consisting of a homopolymer of ethylene oxide, a homopolymer of propylene oxide, and a copolymer of ethylene oxide and propylene oxide, wherein free diisocyanate has been reduced to a level of less than 1% of the prepolymer; B) at least one alkylated aromatic diamine in a quantity sufficient to react with about 50% to about 105% of the available isocyanate content in the prepolymer; and C) at least one catalyst in a quantity sufficient to reduce the pot life to no more than two minutes; whereby said elastomer possesses high resilience and clarity and can be processed safely and at low cost.

Japanese Patent No. 03195770 discloses a blend comprising (a) an organic polyisocyanate, (b) an organic polyisocyanate reactive polymer with a molecular weight of 800-12,000, (c) 5-50 wt. % per (b) of a chain extender containing a hindered aromatic diamine, (d) 0.01-2.0 wt. % of a steric hindered amine type light stabiliser per (b) and optionally a stabiliser for urethane so that the blend has an isocyanate index of 70-130. The blend is treated in a one shot system by reaction injection moulding to make a shaped article of urethane/urea and polyurea. The shaped article is said to have improved paintability, e.g., fading resistance and anti-yellowing property.

Component (d) is preferably at least one of bis(2,2,6,6-tetramethyl-4-piperazyl) sebacate, bis(1,2,2,6,6-pentamethyl-4)sebacate, 1-(2-(3-(3,5-di-t-butyl-4-hydroxyphenyl) propionyloxy))-2,2,6,6-tetramethylpiperizine, 8-benzyl-7,7,9,9-tetramethyl-3-octyl-1,3,3-triazaspiro(4,5)undecan-2,4-dione, 4-benzoyloxy-2,2,6,6-tetramethylpiperazine and 8-acetyl-7,7,9,9-tetramethyl-3-dodecyl-1,3,8-triazaspiro (4,5)undecan-2,4-dione. Component (c) is 2,4-diaminomethylene, 1,3,5-triethyl-2,4-diaminobenzene, 1,3,5-triisopropyl-2,4-diaminobenzene, 1-methyl-3,5-diethyl-2,4-diaminobenzene or 1-methyl-3,5-diethyl-2,6-diaminobenzene etc. Component (a) is a modified polyisocyanate containing 4-4'-diphenylmethanediisocyanate or the isomer.

SUMMARY OF THE INVENTION

It has been found that incorporating a small amount of a hindered amine light stabilizer (HALS) into a high melting aromatic diamine, such as MOCA, can effectively reduce the discoloration of the aromatic diamine at high temperature. Reduction in color formation with just 0.1% of Tinuvin 765 (Ciba-Geigy) added can improve discoloration by 300-400%.

Furthermore, the assay of the aged aromatic diamine is greatly improved by the addition of the HALS.

More particularly, the present invention is directed to a method for stabilizing aromatic diamines at high temperature, which comprises blending in at least one HALS into the aromatic diamine before aging.

In another aspect, the present invention is directed to a composition comprising a blend of an aromatic diamine and a stabilizing quantity of a HALS, whereby the high temperature stability aromatic diamine is improved.

In still another aspect, the present invention is directed to an improved method for polyurethane elastomer production, wherein the aromatic diamine curative has a stabilizing quantity of HALS blended in, thereby improving the stability of the curative, and the color and quality of the polyurethane elastomer products made.

DESCRIPTION OF THE PREFERRED EMBODIMENTS

Hindered amine light stabilizers (HALS) are well known in the art. Tinuvin 765 (Ciba Geigy) is a (1,2,2,6,6-pentamethyl-4-piperidinyl) sebacate mixture. While there are a number of different HALS available on the market today, they are similar in chemistry and function, and tend to differ primarily in physical attributes, such as melting point, volatility, and concentration of active species.

HALS are typically used to prevent discoloration of polymers when exposed to light. They are generally not used to stabilize aromatic amines or other monomeric materials. Furthermore, they are not considered very effective against high temperature degradation. This function is left to primary antioxidants, for example, hindered phenolics and amines, such as Naugard 10 (Crompton Corp.) and Naugard 445 (Crompton Corp.), respectively.

Surprisingly, however, the primary antioxidants tested for the stabilization of MOCA did not prevent discoloration, whereas the HALS did. The quantity of HALS required is 0.01% to 5%, and preferably 0.02% to 1.0%.

Other stabilizers well known in the art include phosphite peroxide decomposers (such as Naugard P, Crompton Corp.), thioester antioxidants, such as pentaerythritol tetrakis(3-dodecylthiopropionate) (Seenox 412S), dialkyl hydroxylamine antioxidants (such as Irgastab FS042, Ciba Geigy), benzophenone UV stabilizers (such as Cyanox 2246, Cytec), and benzotriazole UV absorbers (such as Tinuvin 213, Ciba Geigy). Results of testing with these stabilizers are shown in the examples that follow.

EXAMPLES

Comparative Example A

MOCA (20 gm) was melted on a hot plate and transferred to a 0.5 oz glass jar with a diameter of about 1.4 cm. The jar was left open and placed in an oven at 130° C. Initially, the MOCA was light yellow. After 18 hours, the sample was amber. After two days, the sample was dark amber, and after three days the sample was too dark to see through.

The sample was kept at 130° C. until a total of six days had elapsed, and the MOCA was tested by gas chromatography, GC, for assay, before and after aging. The unaged MOCA had 89.9 area % diamine and 7.7% triamine, plus a host of impurities, all less than 1.0%. This is normal for commercial, technical grade MOCA. After aging at 130° C. for six days, the assay was 87.9% diamine and 7.9% triamine. In addition, several new peaks had formed, the largest amounting to 1.6 area %, at a retention time of 28.0 min (vs. 14.44 min for diamine and 22.75 min for triamine). These peaks were not present before aging. Thus, about 2% of the MOCA had degraded into new impurities.

Examples 1-3

Three glass jars of MOCA were prepared and placed in a 130° C. oven as in Comparative Example A, except that they had 0.1%, 0.2%, and 0.5% by weight of a HALS, Tinuvin 765, added to them, respectively. All three samples were essentially unchanged in appearance after 18 hours at 130° C. After three days at 130° C., they were still as light as or lighter than the control of Comparative Example A at 18 hours. After six days at 130° C., they were still lighter than the control of Comparative Example A after 2 days.

GC analysis was conducted on the Example 1 (with 0.1% Tinuvin 765 added) after six days of aging at 130° C. The assay remained excellent at 89.9 area % diamine and 7.8 area % triamine, with no significant new peaks formed. The peak formed in the control at 28.0 min retention time was completely absent, indicating that this impurity did not form at all.

Comparative Examples B-H

Other well known stabilizers were tested for color stability with results shown in Table 1 below. The "stabilization factor" was calculated as follows:

TABLE 1

$$\frac{(\text{\# Hrs to reach color of Comparative Ex A in 18 hrs} - 1)}{18 \text{ hrs}} = \frac{\text{stabilization}}{\text{factor}}$$

| Experiment | Stabilizer | Weight % Added | Stabilization Factor |
|---|---|---|---|
| Comparative A | None | 0 | 0 x |
| Example 1 | Tinuvin 765 | 0.1 | 3-4 x |
| Example 2 | Tinuvin 765 | 0.2 | 3-4 x |
| Example 3 | Tinuvin 765 | 0.5 | 3-4 x |
| Comparative B | Naugard 10 | 0.2 | 0 x |
| Comparative C | Naugard 445 | 0.2 | 0 x |
| Comparative D | Naugard P | 0.2 | −0.5 x |
| Comparative E | Cyanox 2246 | 0.2 | 0.75-1 x |
| Comparative F | Seenox 412S | 0.2 | 0 x |
| Comparative G | Tinuvin 213 | 0.2 | 0.25-0.5 x |
| Comparative H | Irgastab F5042 | 0.2 | 1-1.5 x |

Naugard 10 is tetrakis{methylene(3,5-di-t-butyl-4-hydroxy-hydrocinnamate)}methane.
Naugard 445 is 4,4'-bis(α,α-dimethylbenzyl)diphenylamine.
Naugard P is tris-nonylphenyl phosphite.
Cyanox 2246 is a benzophenone UV stabilizer.
Seenox 412S is pentaerythritol tetrakis(3-dodecylthiopropionate).
Tinuvin 213 is a substituted benzotriazole mixture.

Irgastab FS042 is bis-(hydrogenated tallow alkyl) hydroxylamine.

Surprisingly, the HALS material (Tinuvin 765) provided the best stabilization. The difference between Example 1 and the second place material, Comparative H, appears even greater as time goes on.

Examples 5-9

Stabilizers are often used in combination. The HALS of Examples 1-3 (Tinuvin 765) was tested in combination with four other stabilizers. The results of the testing are shown in Table 2. No synergy was found, but the secondary stabilizers did not have a negative effect on the color, indicating that such secondary stabilizers can be added for other beneficial purposes, such as to protect the final cured part from degradation, without detriment.

TABLE 2

| Example | % Tinuvin 765 | Second Stabilizer | % Second Stabilizer | Color Index |
|---------|---------------|-------------------|---------------------|-------------|
| 5 | 0.2 | None | 0.0 | 3–4x |
| 6 | 0.2 | Naugard 10 | 0.2 | 3–4x |
| 7 | 0.2 | Cyanox 2246 | 0.2 | 3–4x |
| 8 | 0.2 | Tinuvin 213 | 0.2 | 3–4x |
| 9 | 0.2 | Irgastab FS042 | 0.2 | 3–4x |

In view of the many changes and modifications that can be made without departing from principles underlying the invention, reference should be made to the appended claims for an understanding of the scope of the protection afforded the invention.

What is claimed is:

1. A stabilized methylene bis-orthochloroaniline composition consisting essentially of:
   a) a technical grade methylene bis-orthochloroaniline composition consisting essentially of
      i) 7-8 weight percent of a triamine analog of the methylene bis-orthochloroaniline, wherein the triamine analog contains three aromatic rings, and
      ii) 90 weight percent of methylene bis-orthochloroaniline, wherein the weight percentages are based on the total weight of the technical grade methylene bis-orthochloroaniline composition; and
   b) a stabilizing quantity of a hindered amine light stabilizer.

2. The methylene bis-orthochloroaniline composition of claim 1 wherein the hindered amine light stabilizer is present at a level of 0.01 to 5 weight percent based on the total weight of the technical grade methylene bis-orthochloroaniline composition.

3. The methylene bis-orthochloroaniline composition of claim 1, wherein the hindered amine light stabilizer is a (1,2,2,6,6-pentamethyl-4-piperidinyl) sebacate.

4. A method of stabilizing a technical grade methylene bis-orthochloroaniline composition consisting essentially of
   i) 7-8 weight percent of a triamine analog of the methylene bis-orthochloroaniline, wherein the triamine analog contains three aromatic rings, and
   ii) 90 weight percent of methylene bis-orthochloroaniline, wherein the weight percentages are based on the total weight of the technical grade methylene bis-orthochloroaniline composition from the effects of degradation by heat comprising blending with said technical grade methylene bis-orthochloroaniline composition a stabilizing quantity of a hindered amine light stabilizer to produce a stabilized methylene bis-orthochloroaniline composition consisting essentially of the technical grade methylene bis-orthochloroaniline composition and the hindered amine light stabilizer.

5. The method of claim 4 wherein the hindered amine light stabilizer is present at a level of 0.01 to 5 weight percent based on the total weight of the technical grade methylene bis-orthochloroaniline composition.

6. The method of claim 4, wherein the hindered amine light stabilizer is a (1,2,2,6,6-pentamethyl-4-piperidinyl) sebacate.

7. In a method for the production of polyurethane elastomers comprising the mixing and curing of a polyurethane prepolymer with a technical grade methylene bis-orthochloroaniline composition consisting essentially of
   i) 7-8 weight percent of a triamine analog of the methylene bis-orthochloroaniline, wherein the triamine analog contains three aromatic rings, and
   ii) 90 weight percent of methylene bis-orthochloroaniline, wherein the weight percentages are based on the total weight of the technical grade methylene bis-orthochloroaniline composition,
   the improvement that comprises blending a stabilizing quantity of a hindered amine light stabilizer with the technical grade methylene bis-orthochloroaniline composition to stabilize the methylene bis-orthochloroaniline to produce a stabilized methylene bis-orthochloroaniline composition consisting essentially of the technical grade methylene bis-orthochloroaniline composition and the hindered amine light stabilizer.

8. The method of claim 7 wherein the hindered amine light stabilizer is present at a level of 0.01 to 5 weight percent based on the total weight of the technical grade methylene bis-orthochloroaniline composition.

9. The method of claim 7, wherein the hindered amine light stabilizer is a (1,2,2,6,6-pentamethyl-4-piperidinyl) sebacate.

* * * * *